US008219270B2

(12) United States Patent
Lenart et al.

(10) Patent No.: US 8,219,270 B2
(45) Date of Patent: Jul. 10, 2012

(54) OPERATOR SELECTABLE ELECTRIC VEHICLE PERFORMANCE SWITCH

(75) Inventors: Barry Lenart, Martinez, GA (US); Anthony Williams, Evans, GA (US)

(73) Assignee: Textron Inc., Providence, RI (US)

( * ) Notice: Subject to any disclaimer, the term of this patent is extended or adjusted under 35 U.S.C. 154(b) by 972 days.

(21) Appl. No.: 11/960,948

(22) Filed: Dec. 20, 2007

(65) Prior Publication Data

US 2009/0112383 A1   Apr. 30, 2009

Related U.S. Application Data

(60) Provisional application No. 60/983,970, filed on Oct. 31, 2007.

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)

(52) U.S. Cl. ............................................. 701/22
(58) Field of Classification Search .................. 701/22; 180/65.1, 65.31, 65.6, 65.7; 303/121, 151, 303/152; 318/139, 140, 375, 376; 477/7–9, 477/14, 188
See application file for complete search history.

(56) References Cited

U.S. PATENT DOCUMENTS

| 4,360,766 | A | * | 11/1982 | Bogardus, Jr. | 318/139 |
| 5,065,320 | A | * | 11/1991 | Hayashi et al. | 701/1 |
| 5,433,512 | A | * | 7/1995 | Aoki et al. | 303/3 |
| 5,565,760 | A | * | 10/1996 | Ball et al. | 322/23 |
| RE36,454 | E | * | 12/1999 | Ball et al. | 322/23 |

(Continued)

FOREIGN PATENT DOCUMENTS
CN     1618649 A    5/2005
(Continued)

OTHER PUBLICATIONS

United Kingdom Search Report for Application No. GB 0725092.1, dated Mar. 4, 2008.

(Continued)

*Primary Examiner* — John Nguyen
*Assistant Examiner* — Michael Whalen
(74) *Attorney, Agent, or Firm* — Harness, Dickey & Pierce, P.L.C.

(57) ABSTRACT

An operator selectable performance control system for an electric vehicle, is provided. In various embodiments, the system includes a motor structured and operable to provide motive power and regenerative braking forces to the vehicle and a mechanical brake assembly structured and operable to exert mechanical braking forces to the vehicle. The system additionally includes a controller operable to control the application of motive power and regenerative braking forces of the motor. The system further includes an operator selectable switch structured and operable to changeably select one of a plurality of vehicle performance routines executable by the controller for affecting maximum vehicle speed and an amount of regenerative braking implemented during vehicle operation.

21 Claims, 2 Drawing Sheets

U.S. PATENT DOCUMENTS

| | | | |
|---|---|---|---|
| 6,109,009 A * | 8/2000 | Benson | 56/10.2 G |
| 6,617,703 B2 * | 9/2003 | Matsubara et al. | 290/40 C |
| 7,362,065 B2 * | 4/2008 | Takano | 318/376 |
| 7,841,433 B2 * | 11/2010 | Soliman et al. | 180/65.265 |
| 2005/0007047 A1 * | 1/2005 | Strothmann et al. | 318/268 |
| 2005/0104445 A1 | 5/2005 | Choi | |
| 2005/0231144 A1 | 10/2005 | Takano | |
| 2007/0022634 A1 | 2/2007 | Yamazaki et al. | |
| 2008/0234096 A1 * | 9/2008 | Joshi et al. | 477/3 |
| 2009/0112383 A1 * | 4/2009 | Lenart et al. | 701/22 |
| 2009/0188733 A1 * | 7/2009 | Mack | 180/65.285 |
| 2009/0242285 A1 * | 10/2009 | Whetstone, Jr. | 180/19.2 |
| 2010/0317484 A1 * | 12/2010 | Gillingham et al. | 477/7 |
| 2010/0317485 A1 * | 12/2010 | Gillingham et al. | 477/7 |

FOREIGN PATENT DOCUMENTS

| | | |
|---|---|---|
| JP | 05122805 A | 5/1993 |
| JP | 2002058105 A | 2/2002 |
| JP | 2004142689 A | 5/2004 |
| WO | 2006/039520 A1 | 4/2006 |

OTHER PUBLICATIONS

Office Action for Canadian Application No. 2,616,195 dated Mar. 11, 2011.

Chinese Office Action for Chinese Patent Application No. 200810004239.0 dated Feb. 29, 2012 including English translation.

* cited by examiner

OPERATOR SELECTABLE ELECTRIC VEHICLE PERFORMANCE SWITCH

This application claims the benefit of U.S. Provisional Application No. 60/983,970, filed on Oct. 31, 2007. The disclosure of the above application is incorporated herein by reference in its entirety.

FIELD

The present teachings relate to control systems for electric vehicles.

BACKGROUND

The statements in this section merely provide background information related to the present disclosure and may not constitute prior art.

Electric vehicles are commonly used for various different purposes, such as golf cars, utility vehicles, personal vehicles and transport vehicles. Operators of such electric vehicles can encounter or confront various different terrains and driving circumstance that require various different driving procedure or techniques to safely operate and control the vehicle. For example, it may be desirable for owners of golf cars to restrict the maximum speed at which the vehicle can be driven, while owners of utility, personal and transport vehicles may desire a vehicle capable of higher speeds and/or greater regenerative braking for heavy loads.

SUMMARY

Various aspects of the present disclosure include an operator selectable performance control system for an electric vehicle. In various embodiments, the system includes a motor structured and operable to provide motive power and regenerative braking forces to the vehicle and a mechanical brake assembly structured and operable to exert mechanical braking forces to the vehicle. The system additionally includes a controller operable to control the application of motive power and regenerative braking forces of the motor. The system further includes an operator selectable switch structured and operable to changeably select one of a plurality of vehicle performance routines executable by the controller for affecting maximum vehicle speed and regenerative braking implemented during vehicle operation.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

DETAILED DESCRIPTION

Figure 1:
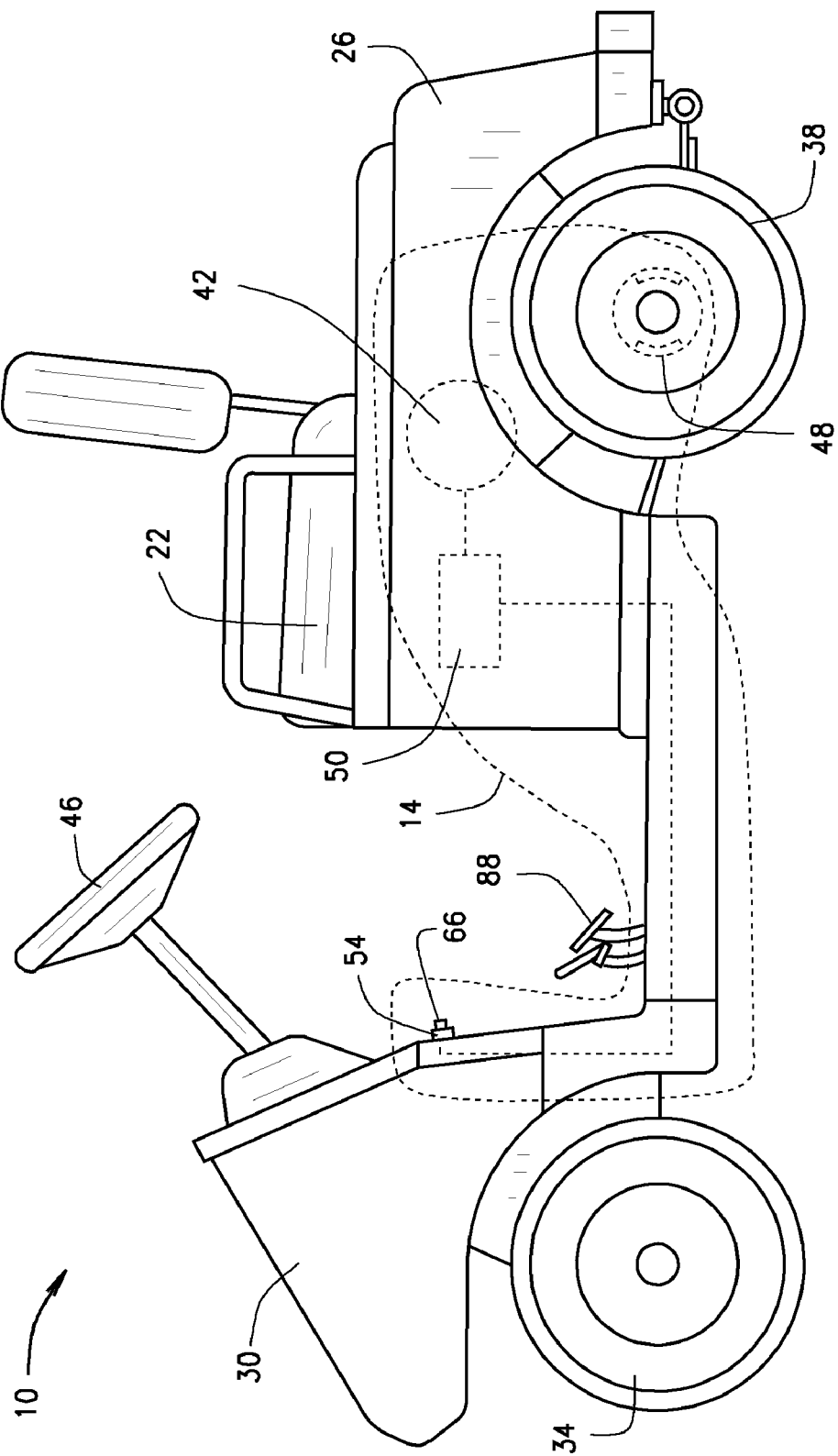
FIG. 1 is a side view of an electric vehicle including an operator selectable performance control system, FIG. 2 a is partial view of an instrument panel of the vehicle shown in FIG. 1, illustrating an operator selectable switch of the operator selectable performance control system, shown in FIG. 1, in accordance with various embodiments of the present disclosure.

The following description is merely exemplary in nature and is in no way intended to limit the present teachings, application, or uses. Throughout this specification, like reference numerals will be used to refer to like elements.

FIG. 1 illustrates a light-weight electric vehicle 10, such as a small cargo/maintenance vehicle, a shuttle/transport vehicle, a golf car, etc., that can include an operator selectable performance control system (OSPCS) 14, in accordance with various embodiments of the present disclosure. The OSPCS 14 is structured and operable to allow a vehicle operator to select any one of a plurality of vehicle performance setting to thereby selectably control various operation parameters of the vehicle 10, e.g., maximum allowable vehicle speed and ratio of regenerative braking to mechanical braking applied during vehicle braking.

Generally, the vehicle 10 can include at least one seat assembly 22 mounted to a rear body section 26, a front body section 30 and a pair of front wheels 34 and a pair of rear wheels 38. At least one of the rear wheels 38 is driven by a prime mover 42, e.g., an induction motor, that provides motive power for propelling the vehicle 10 and regenerative braking forces for decelerating the vehicle 10. The vehicle 10 additionally includes a steering wheel 46 and a mechanical brake assembly 48 for applying mechanical braking forces, i.e., frictional braking forces, to at least one of the rear wheels 38. The vehicle 10 further includes a main controller 50 for controlling various operation parameters of the vehicle 10. For example, the controller 50 can be communicatively connected to the motor 42 and the brake assembly 48 to control motive forces provided by the motor 10, an amount of regenerative braking applied by the motor 10 during a vehicle braking operation, and an amount frictional braking force applied by the braking assembly 48 during a vehicle braking operation.

In various embodiments, the OSPCS 14 includes the motor 42, the mechanical brake assembly 48 and the controller 50 that, as described above, is operable to control the application of motive power and regenerative braking forces of the motor 42, and the application of mechanical braking forces by the brake assembly 48. The OSPCS 14 further includes an operator selectable switch (OSS) 54 that is structured and operable to be positioned by a vehicle operator to one of a plurality of vehicle performance settings.

As described below, each of the performance settings evokes a corresponding one of a plurality of performance routines stored in electronic memory 58 (shown in FIG. 2) of the controller 50 and executable by a processor 62 (shown in FIG. 2) of the controller 50. Execution of the performance routines controls the various operation parameters in a particular manner. Thus, the OSS 54 can be changeably positioned by an operator to any of the performance settings to implements a different set of operation parameters that govern the operation of the vehicle 10. More particularly, execution of each respective performance routine implements a different set of operation parameters that govern operation of the motor 42 and the brake assembly 48. For example, in various embodiments, the operation parameters can include a maximum allowable speed of the vehicle, an amount of regenerative braking applied by the motor during a vehicle braking operation and an amount of mechanical braking applied by the brake assembly during the vehicle braking operation. In various embodiments, the OSS 54 can be a key operated switch that utilizes a single key 66 to position the OSS 54 in any of the various performance settings.

Figure 2:
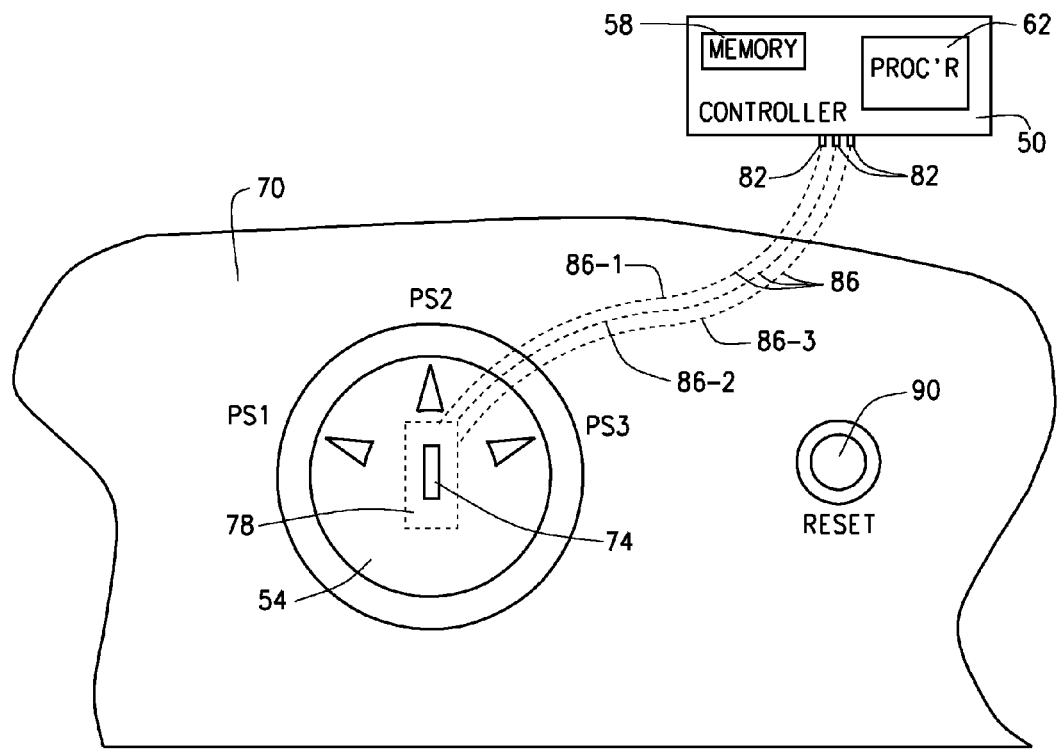

FIG. 2 illustrates a portion of an instrument panel 70 of the vehicle 10 including the OSS 54, in accordance with various embodiments of the present disclosure. Although the OSS 54 will be described herein as being in included in the instrument panel 70, the OSS 54 can be located elsewhere on the vehicle 10, e.g., on the rear body portion 26 below the seat 22, and remain within the scope of the present disclosure. Additionally, the OSS 54 will be described herein as including three performance settings PS1, PS2 and PS3, however, it is envisioned that the OSS 54 can include more than three or less than three performance settings and remain with the scope of the present disclosure. The OSS 54 includes a mechanical position selector 74 that is operatively, i.e., mechanically or electrically, connected to a switch board 78. The switch board 78 is electrically connected to ports or pins 82 of the controller 50, via wires 86. As described above, in various embodiments, the position selector 74 can comprise a keyed tumbler and aperture for receiving the single key 66 that can be used to position the OSS 54 at any of the performance settings PS1, PS2 or PS3. In such embodiments, the key 66 can be removed at any of the performance settings PS1, PS2 or PS3 such that the OSS 54, and thus, the OSPCS 14, is locked at the respective performance setting.

Alternatively, in various embodiments, the position selector 74 can be a non-removable tab that can be rotatably positioned to any of the performance settings PS1, PS2 or PS3. In various other embodiments, the position selector can be a three-position push button switch, a security code key pad or any other switching mechanism or device suitable for selecting any of the performance settings PS1, PS2 or PS3.

Figure 3:
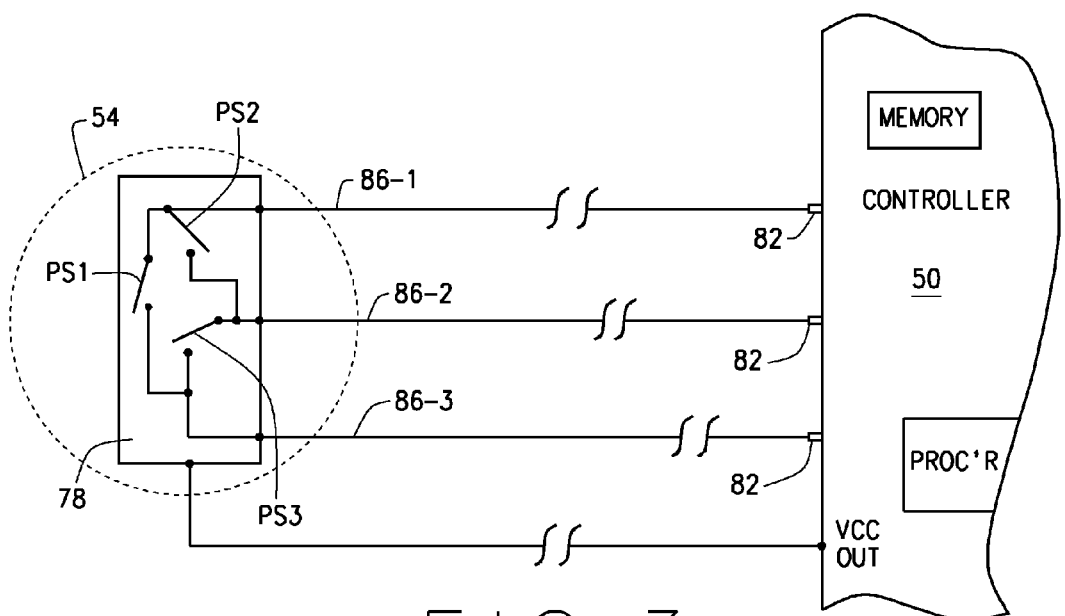
FIG. 3 is an exemplary schematic of a switch block of the operator selectable switch, shown in FIG. 1, in accordance with various embodiments of the present disclosure.

The switch board 78 generally includes circuitry and/or mechanical devices operable to connect, i.e., electrically short or jumper, various combinations of two or more of the wires 86. For example, referring to FIG. 3, if the OSS 54 is set to the PS1 position wires 86-1 and 86-3 may be shorted together, while if the OSS 54 is set to the PS2 position wires 86-1 and 86-2 may be shorted together, while if the OSS 54 is set to the PS3 position wires 86-2 and 86-3 may be shorted together. Accordingly, each combination of connected wires 86 provides electrical inputs to particular corresponding combination of controller pins 82. In accordance with various embodiments, each combination of electrical inputs to pins 82 evokes a corresponding one of the performance routines stored in the memory device 58. More particularly, based on the particular combination of electrical inputs sensed by the controller 50, the processor 62 will execute a corresponding one of the performance routines to implement a corresponding set of operation parameters during operation of the vehicle 10.

More particularly, in various embodiments, based on the performance setting selected, i.e., based on the electrical inputs at pins 82 sensed by the controller 50, the processor 62 will execute a corresponding one of the performance routines to implement a maximum allowable vehicle speed parameter and an amount of regenerative braking applied during vehicle braking operations. The amount of mechanical braking provided by the brake assembly 48 during braking operations is dependent on force applied to a brake pedal 88 (shown in FIG. 1) of the vehicle 10. Still more specifically, as a result of executing each particular performance routine, the controller 50 will control the motive power generated by motor 42 to limit the speed of the vehicle 10 to a specific maximum limit. Additionally, the controller 50 will control the amount of regenerative braking provided by the motor 10 during vehicle operation, e.g., during vehicle braking operations.

For example, when the OSS 54 is set to the first performance setting PS1, also referred to herein as the 'Daily Use' setting, the controller 50, i.e., the processor 62, will execute a first performance routine. In various embodiments, the first performance routine will limit the maximum vehicle speed generated by the motor 42 to approximately 13 to 16 miles per hour and provide a first amount of regenerative braking by the motor 42 during vehicle operation, e.g., during vehicle braking operations. For example, the first performance routine can provide approximately 0.3 to 0.5 mph/sec, e.g., 0.41 mph/sec, deceleration via regenerative braking by the motor 42 during vehicle operation, e.g., during vehicle braking operations. As described above, mechanical braking provided by the brake assembly 48 during a braking operation is dependent on force applied to a brake pedal 88.

When the OSS 54 is set to the second performance setting PS2, also referred to herein as the 'Heavy Load' setting, the controller 50, i.e., the processor 62, will execute a second performance routine. In various embodiments, the second performance routine will limit the maximum vehicle speed generated by the motor 42 to approximately 11 to 14 miles per hour provide a second amount of regenerative braking by the motor 42 during vehicle operation, e.g., during vehicle braking operations. The second amount of regenerative braking being greater than the first amount of regenerative braking. For example, the second performance routine can provide approximately 2.0 to 2.75 mph/sec deceleration via regenerative braking by the motor 42 during vehicle operation, e.g., during vehicle braking operations. Amounts of mechanical braking by the brake assembly 48 during vehicle operation are dependent on force applied to the brake pedal 88.

When the OSS 54 is set to the third performance setting PS2, also referred to herein as the 'Fast Transport' setting, the controller 50, i.e., the processor 62, will execute a third performance routine. In various embodiments, the third performance routine will limit the maximum vehicle speed generated by the motor 42 to approximately 15 to 19 miles per hour and provide no regenerative braking, but rather only mechanical braking by the brake assembly 48 in accordance with the amount of force applied to the brake pedal 88 during vehicle operation, e.g., during vehicle braking operations.

As illustrated in FIG. 2, in various embodiments, the OSPCS 14 can include a reset button 90. The reset button can be used in combination with the OSS 54 to reset the controller 50 upon a change in the performance setting of the OSS 54. More particularly, when the vehicle operator moves the position selector 74 from one of the performance settings PS1, PS2 or PS3 to a different performance setting PS1, PS2 or PS3, the operator must then actuate, e.g., depress, toggle, rotate, slide, etc., reset switch 90 to reset the controller 50. Generally, resetting the controller 50 reinitializes the controller 50 such that the controller will sense which pins 82 are presently receiving electrical signals based on which wires 86 are connected as a result of repositioning the position selector 74 to a different performance setting PS1, PS2 or PS3. Based on the pin 82 inputs, the controller 50 will evoke and execute the corresponding performance routine, as described above.

Thus, to select a desired performance setting for the vehicle 10, with power to the vehicle 10 turned 'On', i.e., enabled, the operator positions the position selector to a desired performance setting PS1, PS2 or PS3. As described above, each performance setting PS1, PS2 or PS3 will connect a respective combination of wires 86, which provide electrical inputs to a corresponding combination of controller pins 82. Based on the pin 82 inputs the controller 50 will evoke and execute a respective one of the performance routines corresponding to the selected performance setting. In various embodiments, the performance setting PS1, PS2 or PS3 is implemented by the operator actuating the controller reset switch 90.

It should be understood that, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Thus, a first element, component, region, layer or section discussed below could be termed a second element, component, region, layer or section without departing from the teachings of the example embodiments.

Additionally, the terminology used herein is for the purpose of describing particular example embodiments only and is not intended to be limiting. As used herein, the singular forms "a", "an" and "the" may be intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, the description herein is merely exemplary in nature and, thus, variations that do not depart from the gist of that which is described are intended to be within the scope of the teachings. Such variations are not to be regarded as a departure from the spirit and scope of the teachings.

What is claimed is:

1. An operator selectable performance control system for an electric vehicle, said system comprising:
    a motor structured and operable to provide motive power and regenerative braking forces to the vehicle;
    a mechanical brake assembly structured and operable to exert mechanical braking forces to the vehicle;
    a controller operable to control the application of motive power and regenerative braking forces of the motor;
    an operator selectable switch having at least three switch positions to changeably select between at least three individual vehicle performance routines in a forward direction executable by the controller, each of the vehicle performance routines implementing a different setting of operation parameters, the first setting having a first maximum vehicle speed and a first amount of regenerative braking, the second setting having a second maximum vehicle speed less than the first maximum vehicle speed and a second amount of regenerative braking greater than the first amount of regenerative braking, and the third setting having a third maximum vehicle speed greater than the first and second maximum vehicle speeds and no regenerative braking.

2. The system of claim 1 further comprising a reset switch operable to reset the controller to execute a selected performance routine.

3. The system of claim 1, wherein the operator selectable switch comprises key operated switch structured and operable to utilize a single key to position the switch at any of a plurality of performance settings, each performance setting corresponding to a respective one of the performance routines.

4. The system of claim 3, wherein the key is removable at any of the performance settings such that the system is locked at the respective performance setting.

5. The system of claim 1, wherein the operator selectable switch is structured and operable to select any of a plurality of performance settings, each setting connecting two or more of a plurality of wires connected to the controller to command the controller to execute a respective one of the performance routines corresponding to the selected performance setting.

6. The system of claim 1, wherein the first setting limits the maximum vehicle speed generated by the motor to approximately 13 to 16 miles per hour.

7. The system of claim 6, wherein the second setting limits the maximum vehicle speed generated by the motor to approximately 11 to 14 miles per hour.

8. The system of claim 7, wherein the third setting limits the maximum vehicle speed generated by the motor to approximately 15 to 19 miles per hour and provides only mechanical braking during vehicle operation.

9. An electric vehicle comprising:
    operator selectable performance control system, said system including:
    a motor structured and operable to provide motive power and regenerative braking forces to the vehicle;
    a mechanical brake assembly structured and operable to exert mechanical braking forces to the vehicle in accordance with force applied to a brake pedal of the vehicle;
    a controller operable to control the application of motive power and regenerative braking forces of the motor during vehicle operation;
    an operator selectable key switch structured and operable to utilize a single key to changeably select one of a plurality of vehicle performance routines executable by the controller, each respective performance routine executable to implement a different set of operation parameters for the motor and the brake assembly, the operation parameters including, a first setting having a first maximum vehicle speed and a first amount of regenerative braking, a second setting having a second maximum vehicle speed less than the first maximum vehicle speed and a second amount of regenerative braking greater than the first amount of regenerative braking, and a third setting having a third maximum vehicle speed greater than the first and second maximum vehicle speeds and no regenerative braking.

10. The vehicle of claim 9 further comprising a reset switch operable to reset the controller to execute a selected performance routine.

11. The vehicle of claim 9, wherein the key is removable at any of the performance settings such that the system is locked at the respective performance setting.

12. The vehicle of claim 9, wherein the operator selectable key switch is structured and operable to select any of a plurality of performance settings, each setting connecting two or more of a plurality of wires connected to the controller to command the controller to execute a respective one of the performance routines corresponding to the selected performance setting.

13. The vehicle of claim 9, wherein the performance routines include:
    the first setting having the first maximum vehicle speed generated by the motor of approximately 13 to 16 miles per hour and the first amount of regenerative braking being approximately 0.3 to 0.5 mph/sec deceleration via regenerative braking by the motor during vehicle operation;
    the second setting having the second maximum vehicle speed generated by the motor of approximately 11 to 14 miles per hour and the second amount of regenerative braking being approximately 2.0 to 2.75 mph/sec deceleration via regenerative braking by the motor during vehicle operation; and the third setting having the third maximum vehicle speed generated by the motor of approximately 15 to 19 miles per hour and provide only mechanical braking during vehicle operation.

14. A method for controlling a plurality of operations of an electric vehicle, said method comprising:
   positioning an operator selectable key switch to one of three switch positions each corresponding to one a plurality of vehicle performance routines executable by a vehicle controller,
   executing the selected vehicle performance routine to implement a corresponding one of a plurality of settings of operation parameters;
   controlling a maximum allowable speed of the vehicle such that a first setting has a first maximum vehicle speed, a second setting has a second maximum vehicle speed less than the first maximum vehicle speed, and a third setting has a third maximum vehicle speed greater than the first and second maximum vehicle speeds;
   controlling an amount of regenerative braking provided by a motor of the vehicle during a vehicle braking operation such that the amount of regenerative braking of the second setting is greater than the amount of regenerative braking of the first setting and the third setting has no regenerative braking; and
   providing mechanical braking in accordance with an amount of pressure applied to a vehicle brake pedal.

15. The method of claim 14 further comprising activating a reset switch to reset the controller to execute a selected performance routine upon selection of the respective performance routine.

16. The method of claim 14, wherein positioning an operator selectable key switch comprises utilizing a single key to position the key switch at any of a plurality of performance settings, each performance setting corresponding to a respective one of the performance routines.

17. The method of claim 16, wherein positioning an operator selectable key switch further comprises removing the key from the key switch upon selection of the respective performance setting such that the key switch is locked at the respective performance setting.

18. The method of claim 16, wherein executing the selected vehicle performance routine comprises connecting two or more of a plurality of wires connected to the controller as a result of positioning the key switch to one of vehicle performance setting, each performance setting connecting a different combination of the two or more wires, thereby commanding the controller to execute a respective one of the performance routines corresponding to the selected performance setting.

19. The method of claim 16, wherein controlling the maximum allowable speed comprises limiting the maximum vehicle speed generated by the motor to approximately 13 to 16 miles per hour for the first setting.

20. The method of claim 19, wherein controlling the maximum allowable speed comprises limiting the maximum vehicle speed generated by the motor to approximately 11 to 14 miles per hour for the second setting.

21. The method of claim 16, wherein controlling the maximum allowable speed comprises limiting the maximum vehicle speed generated by the motor to approximately 15 to 19 miles per hour for the third setting.

* * * * *

UNITED STATES PATENT AND TRADEMARK OFFICE
CERTIFICATE OF CORRECTION

| | | |
|---|---|---|
| PATENT NO. | : 8,219,270 B2 | |
| APPLICATION NO. | : 11/960948 | |
| DATED | : July 10, 2012 | |
| INVENTOR(S) | : Barry Lenart et al. | |

It is certified that error appears in the above-identified patent and that said Letters Patent is hereby corrected as shown below:

In the Specification:

At column 1, line 23 (Specification, page 1, line 14): "circumstance" should be --circumstances--.

At column 1, line 23 (Specification, page 1, line 15): "procedure" should be --procedures--.

At column 2, line 35 (Specification, page 4, line 11): After "amount" insert --of--.

At column 2, line 55 (Specification, page 5, line 3): "implements" should be --implement--.

At column 3, line 4 (Specification, page 5, lines 16): "being in included" should be --being included--.

In the Claims:

At column 7, line 8, claim 14 (Amendment dated 1/18/12, page 8, line 4, claim 14): "one a" should be --one of a--.

Signed and Sealed this
Eleventh Day of September, 2012

David J. Kappos
*Director of the United States Patent and Trademark Office*